USOO6064981A

United States Patent [19]
Barni et al.

[11] Patent Number: 6,064,981
[45] Date of Patent: May 16, 2000

[54] METHOD FOR ONLINE DISPLAY AND NEGOTIATION OF CARGO RATES

[76] Inventors: Neil A. Barni, 2220 Canton Lofts #103, Dallas, Tex. 75201; Daniel M. Miller, 53 Highland Rd., Mahopac, N.Y. 10541-2909

[21] Appl. No.: 09/335,451

[22] Filed: Jun. 17, 1999

[51] Int. Cl.[7] .................................................. G06F 17/30
[52] U.S. Cl. ........................ 705/26; 705/26; 705/400; 705/401; 705/402; 705/408; 705/409; 705/407
[58] Field of Search .............................. 705/26, 400, 401, 705/402, 408, 409, 407

[56] References Cited

U.S. PATENT DOCUMENTS

| | | | |
|---|---|---|---|
| 4,713,761 | 12/1987 | Sharpe et al. | 364/406 |
| 5,072,397 | 12/1991 | Barns-Slavin et al. | 364/464 |
| 5,117,364 | 5/1992 | Barns-Slavin et al. | 364/464 |
| 5,629,982 | 5/1997 | Micali | 380/30 |
| 5,666,420 | 9/1997 | Micali | 380/30 |
| 5,794,207 | 8/1998 | Walker et al. | 705/23 |
| 5,794,219 | 8/1998 | Brown | 705/37 |
| 5,812,670 | 9/1998 | Micali | 380/25 |
| 5,826,244 | 10/1998 | Huberman | 705/37 |
| 5,835,896 | 11/1998 | Fisher et al. | 705/37 |
| 5,845,266 | 12/1998 | Lupien et al. | 705/37 |
| 5,850,442 | 12/1998 | Muftic | 380/21 |
| 5,890,138 | 3/1999 | Godin et al. | 705/26 |
| 5,897,620 | 4/1999 | Walker et al. | 705/5 |
| 5,905,975 | 5/1999 | Ausubel | 705/37 |
| 5,966,699 | 10/1999 | Zandi | 705/38 |

*Primary Examiner*—Stephen R. Tkacs
*Assistant Examiner*—Phillip Groutt
*Attorney, Agent, or Firm*—David H. Judson

[57] ABSTRACT

Freight forwarders and carriers post published rate and discount information for land, sea and air bearing cargo vessels to allow customers the opportunity to evaluate competitive prices, preferably in one consolidated location (e.g., a web site). A customer navigates to the site to obtain published or discounted rate information offered by a freight forwarder or carrier. The customer may accept a posted rate, in which case the site operator notifies the freight forwarder or carrier. Alternatively, customers, freight forwarders and carriers may negotiate rates for particular lanes of interest using an online interactive auction block.

17 Claims, 7 Drawing Sheets

METHOD FOR ONLINE DISPLAY AND NEGOTIATION OF CARGO RATES

This application includes subject matter that is protected by Copyright Law. All rights in such content are reserved.

BACKGROUND OF THE INVENTION

1. Technical Field

The present invention relates generally to the transportation of cargo by land, sea or air. More particularly, the invention relates to an online auction method and system whereby users of online systems, namely, customers, freight forwarders and carriers, may negotiate cargo rates with each other in an online, anonymous manner. In addition, the invention relates to an online system at which freight forwarders and carriers may post published rate and discount information for land, sea and air bearing cargo vessels to allow customers the opportunity to evaluate competitive prices, preferably in one consolidated location (e.g., a web site).

2. Description of the Related Art

The World Wide Web is the Internet's multimedia information retrieval system. In the web environment, client machines effect transactions to web servers using the Hypertext Transfer Protocol (HTTP), which is a known application protocol providing users access to files (e.g., text, graphics, images, sound, video, etc.) using a standard page description language known as Hypertext Markup Language (HTML). HTML provides basic document formatting and allows the developer to specify "links" to other servers and files. In the Internet paradigm, a network path to a server is identified by a so-called Uniform Resource Locator (URL) having a special syntax for defining a network connection. Use of an HTML-compatible browser (e.g., Netscape Navigator or Microsoft Internet Explorer) at a client machine involves specification of a link via the URL. In response, the client makes a request to the server identified in the link and, in return, receives a document or other object formatted according to HTML. A collection of documents supported on a web server is sometimes referred to as a web site.

One of the technical advantages of the World Wide Web is the ease with which information may be posted and retrieved by users. Any computer user may navigate to a web site of interest and obtain relevant information hosted by the site. Thus, in the freight industry, many freight forwarders and carriers now have web sites that include posted rate information for the specific carrier. A customer (namely, an entity that desires to ship given cargo by land, sea or air) may navigate to the freight forwarder's or the carrier's web site using a conventional web browser and obtain useful shipping and rate information. While this approach is advantageous, a user cannot obtain competitive rate information without having to visit multiple third party sites and manually comparing the information located during such searching. Moreover, most sites will not even provide rate information to a user without the user first identifying itself (perhaps in a secure manner) to the carrier. Further, even if customers do spend the time searching across multiple sites to obtain competitive rate information, they are still limited to accepting the posted shipping lanes and/or rates.

It would be highly desirable to provide an improved online business method wherein customers can obtain cargo rates anonymously from one or more freight forwarders and/or carriers, and negotiate shipping routes and pricing with freight forwarders and carriers. The present invention solves these problems.

BRIEF SUMMARY OF THE INVENTION

According to the present invention, freight forwarders and carriers post published rate and discount information for land, sea and air bearing cargo vessels to allow customers the opportunity to evaluate competitive prices, preferably in one consolidated location (e.g., a web site). A customer navigates to the site to obtain published or discounted rate information offered by a freight forwarder or carrier. The customer may accept a posted rate, in which case the site operator notifies the freight forwarder or carrier.

According to another feature of the invention, the web site offers an auction block at which anonymous (or identified) buyers and sellers may post and accept bids for shipping giving cargo loads over given shipping lanes. Thus, for example, using the auction block, an anonymous buyer (i.e., a customer) may make a bid that may be accepted by a seller (a freight forwarder or carrier). Alternatively, an anonymous or known seller (a forwarder or carrier) may make a bid, e.g., because the entity has additional unused capacity over a given route at a given time, which bid may then be accepted by a buyer (e.g., an anonymous customer). After a given bid is accepted, the site notifies each of the parties, e.g., by e-mail, of the outcome (e.g., acceptance) of a given negotiation for a posted bid. Preferably, the site earns a fee for each seller bid that is accepted by a given buyer. Likewise, the site may earn a fee for each buyer bid that is accepted by a given seller.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
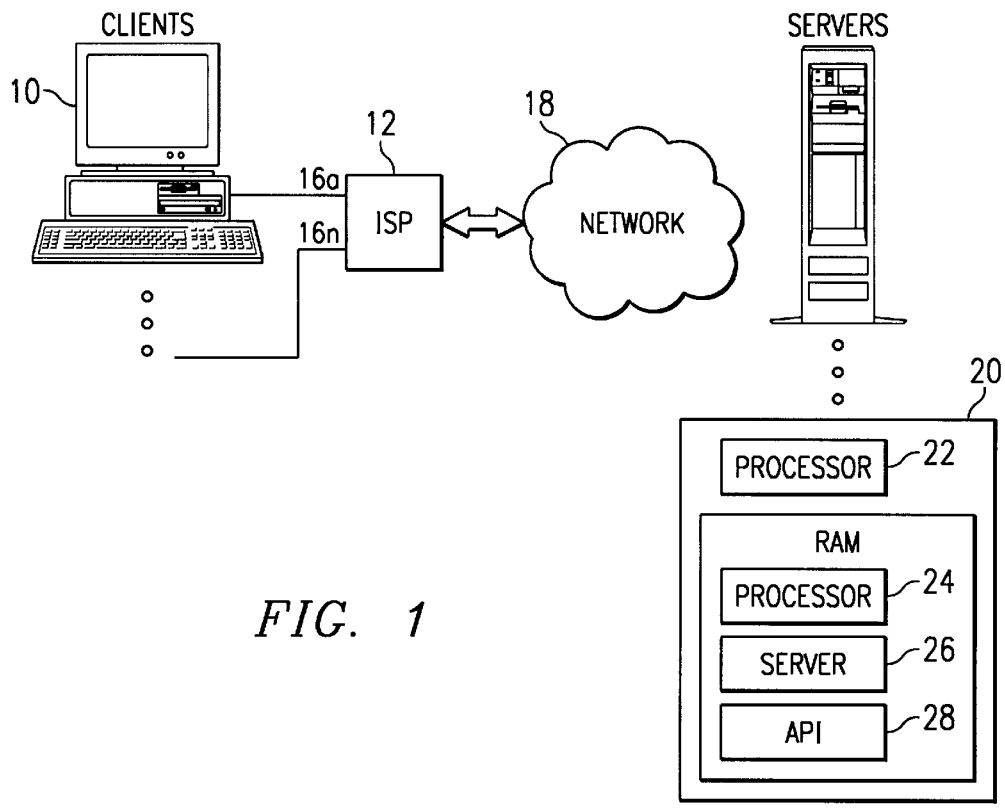
FIG. 1 is a simplified illustration of a client-server environment in which the present invention may be implemented.

A representative system in which the present invention is implemented is illustrated in FIG. 1. A plurality of Internet client machines 10 are connectable to a computer network Internet Service Provider (ISP) 12 via a network such as a dialup telephone network 14. As is well known, the dialup telephone network usually has a given, limited number of connections 16a–16n. ISP 12 interfaces the client machines 10 to the remainder of the network 18, which includes a plurality of web content server machines 20. Network 18 typically includes other servers (not shown) for control of domain name resolution, routing and other control functions. A client machine typically includes a suite of known Internet tools, including a Web browser, to access the servers of the network and thus obtain certain services. These services include one-to-one messaging (e-mail), one-to-many messaging (bulletin board), on-line chat, file transfer and browsing. Various known Internet protocols are used for these services. Thus, for example, browsing is effected using the Hypertext Transfer Protocol (HTTP), which provides users access to multimedia files using Hypertext Markup Language (HTML). The collection of servers that use HTTP comprise the World Wide Web, which is the Internet's multimedia information retrieval system.

As will be seen, a given server in the computer network operates a web site at which a plurality of freight forwarders/carriers may publish rates in a centralized location. Customers, namely, users of client machines, may browse the site to obtain rate data and/or to participate in online cargo lane auctions as will be seen. A given client machine and the server may communicate over the public Internet, an intranet, or any other computer network. If desired, given communications may take place over a secure connection. Thus, for example, a client may communicate with the server using a network security protocol, such as Netscape's Secure Socket Layer (SSL) protocol or the IETF's Transport Layer Security (TLS) protocol.

A representative client is a personal computer, notebook computer, Internet appliance or pervasive computing device (e.g., a PDA or palm computer) that is x86-, PowerPC®- or RISC-based. The client includes an operating system such as Microsoft Windows, Microsoft Windows CE or PalmOS. As noted above, the client includes a suite of Internet tools including a Web browser, such as Netscape Navigator or Microsoft Internet Explorer, that has a Java Virtual Machine (JVM) and support for application plug-ins or helper applications. A representative web server is an IBM Netfinity server comprising a RISC-based processor 22, a UNIX-based operating system 24 and a web server program 26. The server may include an application programming interface 28 (API) that provides extensions to enable application developers to extend and/or customize the core functionality thereof through software programs including plug-ins, CGI programs, servlets, and the like.

The present invention is preferably implemented as a computer program operative at a web server. Although the invention will be described in the context of a single web server, one of ordinary skill in the art will appreciate that the described functionality may be implemented across multiple servers. Moreover, the web site may be mirrored at additional servers in the network and, if desired, one or more management servers or other computer resources may be used to facilitate various billing, accounting and administrative functions as a "back end" to the underlying site.

The computer program at the web site includes appropriate display routines for generating a set of display screens that together comprise a user interface for the site. FIGS. 2–12 are representative display screens, although the particular screen layouts should not be taken to limit the scope of the present invention.

Figure 2:
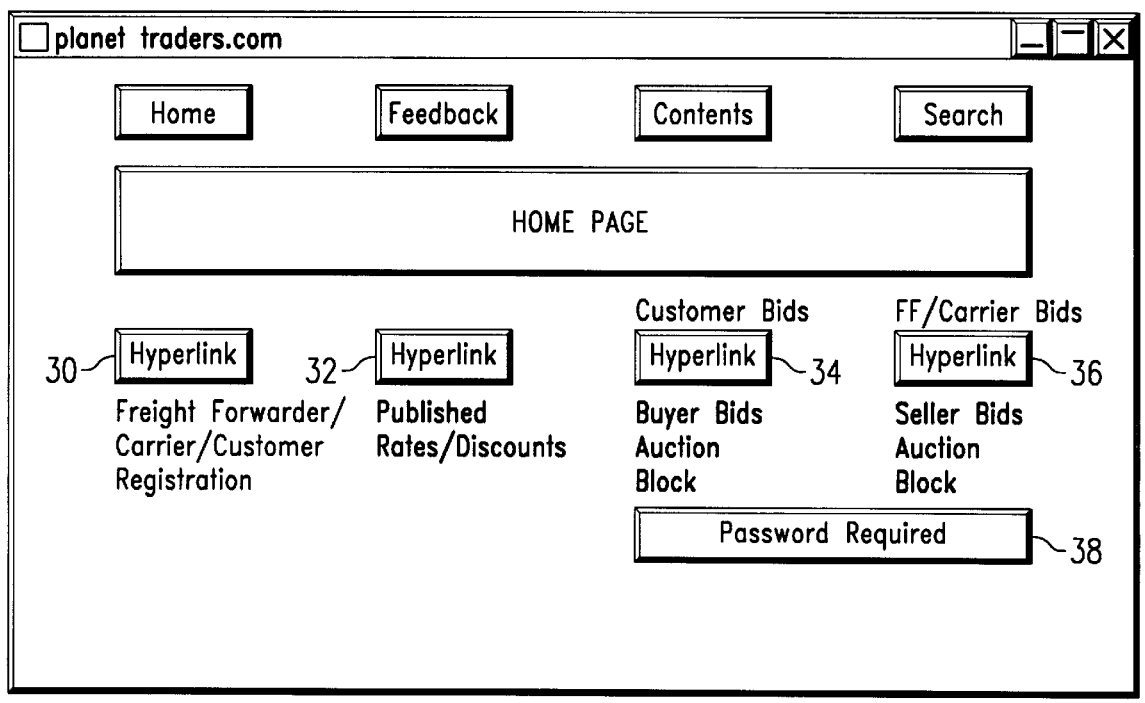
FIG. 2 is a simplified user interface illustrated a home page for the cargo data trading web site of the present invention.

FIG. 2 is a simplified user interface illustrating a home page for the web site of the present invention. A user, which may be a customer or a carrier/forwarder as will be seen, navigates to this page in the usual manner, i.e., by entering the URL for the page in the user's web browser or by activating a bookmark or link. The home page preferably includes a set of links. A first link 30 navigates to a registration page illustrated in FIG. 3. A second link 32 navigates to a published rates page as illustrated in FIG. 4. A third link 34 navigates to an auction block and, in particular, to a page at which customer bids are posted. Such bids are sometimes referred to herein as buyer bids because they are bids by which customers buy the right to ship goods on particular shipping lanes of interest at auctioned rates. A fourth link 36 navigates to the auction block and, in particular, to a page at which forwarder/carrier bids are posted. Such bids are sometimes referred to herein as seller bids because they are bids by which freight forwarders and carriers sell the right to ship goods on particular shipping lanes of interest at auctioned rates. As will be seen, the participants may use the auction block anonymously. As illustrated in FIG. 2, preferably a password is required before a given participant (buyer or seller) may access the auction block. To this end, a user may enter the password in the field 38 or, alternatively, select a password button that calls a CGI script (or the like) that must be completed before the participant obtains access to the auction block. This is not a requirement of the present invention, however.

Generalizing, according to the invention, a "buyer" is any entity or entities desiring to move cargo from one location to another, while a "seller" is any entity or entities engaged in the transport, and/or arrangement for transport, of cargo from one location to another by whatever means. Given cargo is shipped in containers or, more generically, units. Thus, a representative seller is a carrier, common carrier, freight forwarder, or the like, that ships cargo containers over a given shipping lane defined between an origination point and a destination point. Moreover, a given seller or buyer may be, for example, a person, an organization, an entity, a computer, a machine, a resource, a device, a process, or a program. Thus, one of ordinary skill in the art will appreciate that the activities of buyers and sellers in accordance with this invention may be under programmatic control and, thus, partially or fully automated.

As will be described further below, a given buyer and a given seller may use the present invention and/or the tools described below to reach an understanding regarding a given shipment. Thus, as will be seen, a given buyer may negotiate with a given seller (or vice versa) online to secure a cargo shipping commitment. As used herein, a "commitment" may be conditional, unconditional, provisional, or the like, as the parties or the site provider may agree. Thus, the present invention is not limited to any particular contractual understanding that may be created between buyer and seller.

Figure 3:
FIG. 3 is a representative registration and rate update form for the web site.
Figure 4:
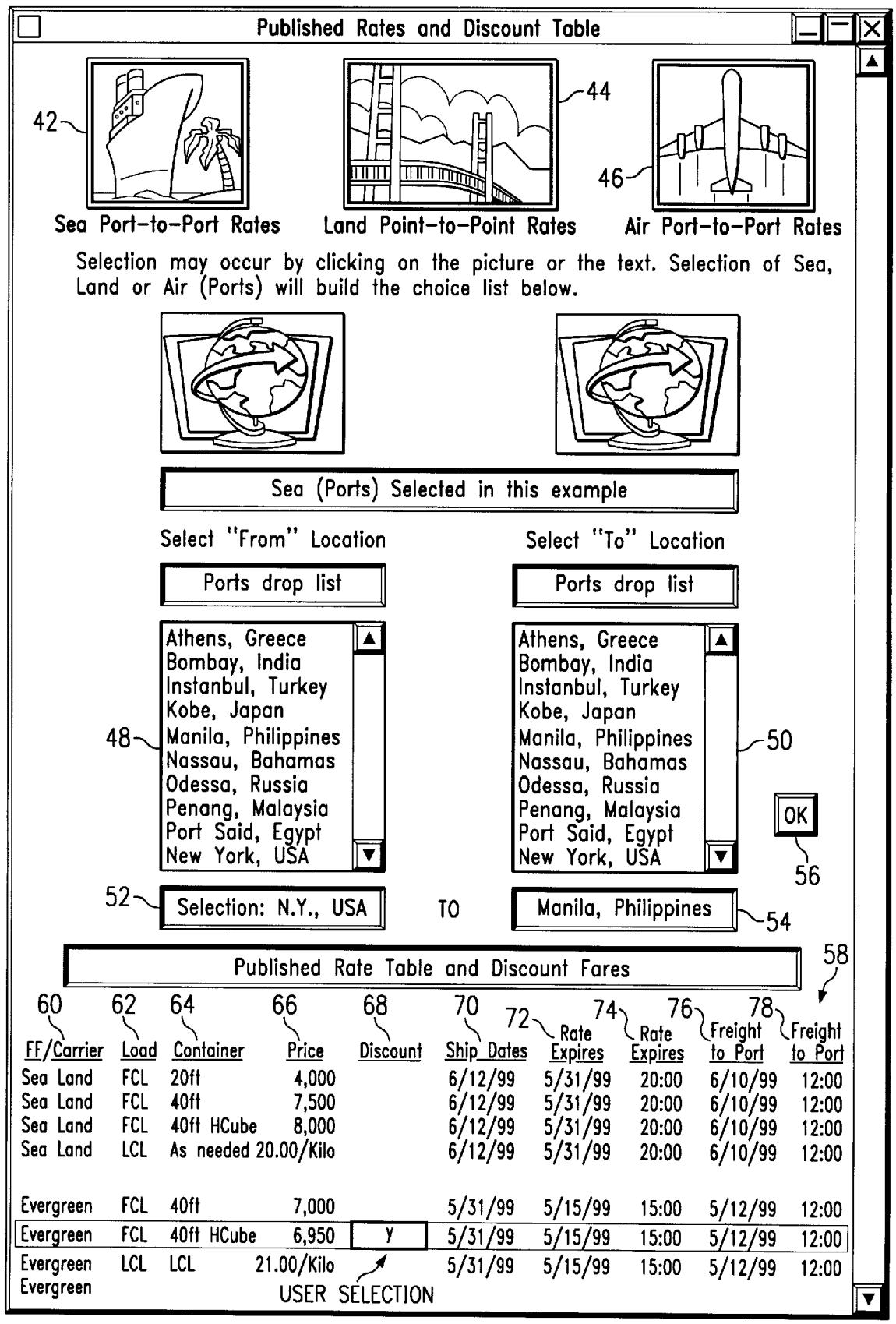
FIG. 4 is a representative user screen for obtaining published rates and discounts.

Activation of the first link 30 navigates the user to a registration form as illustrated in FIG. 3. This form is preferably implemented as a CGI script in a known manner. Preferably, the screen is used to identify a given freight forwarder or ocean carrier to the site by name, address, e-mail, phone number, and other such information. If the company is already registered with the online service, the system automatically populates the information in the display screen. If the entity enters Yes in the Customer field 40, the entity has the right to act as a customer and, therefore, may participate anonymously in online cargo rate auctions, as will be described below. When the screen is accessed, the entity's last sign-on is also identified. If desired, the display screen may be restricted unless a given user has entered an appropriate account number and/or other validator.

Activation of the second link 32 in the home page navigates the user to a published rate page as illustrated in FIG. 4. This page may also be reached from the registration page or, of course, from any other page of interest (including a third party site). According to the present invention, freight forwarders and carriers post published rate and discount information for land, sea and air bearing cargo vessels. This information allows customers the opportunity to evaluate competitive prices in one consolidated location instead of having to navigate to individual company web sites. Moreover, use of the site does not require the prospective customer to submit a personal request for quote to a given freight forwarder or carrier. As seen in FIG. 4, preferably the information is made available in a point-to-point format so that customers can view and accept the suggested rates in an online manner.

Alternatively, and as will be seen, users can post anonymous buyer bids for review and acceptance by freight forwarders and carriers, or freight forwarders and carriers can post anonymous seller bids for review and acceptance by customers.

In the illustrative embodiment, sea port-to-port rates are selected by activating the image link 42. Land point-to-point rates are selected by activating the image link 44. Air port-to-port rates are selected by activating the image link 46. In this example, the sea ports link 42 has been selected. This opens up (or otherwise populates) a pair of listboxes 48 and 50. Listbox 48 includes a set of "from" locations while listbox 50 includes a set of "to" location. Using a keyboard or mouse, the user of the client machine selects a shipping lane, which is defined by a given "from" location in listbox 48 to a given "to" location in listbox 50. The resulting selection is set forth in the display fields 52 and 54. After clicking the OK button 56, the site displays the published rate table 58 and discount fares available for the selected shipping lane.

As can be seen, this table identifies two carriers that service this shipping lane, in this case Sea Land and Evergreen. While the actual information displayed may be quite variable, in the preferred embodiment the table displays a number of fields: the identity of the carrier 60, the type of load 62 ("FCL" or full container load), the size of the container 64, the price 66, any published discount 68, the scheduled ship date 70, the date at which the rate expires 72, the time at which the rate expires on the expiration date 74, the date by which the customer must have the freight to port 76, and the time by which the customer must have the freight to port on such date 78. Of course, the above data fields are merely illustrative, and one may add other fields, such as whether a given container is refrigerated or dry, an estimated arrival time of the container, a tracking number for the container, carrier/forwarder classification information (to facilitate buyer review and selection), or the like.

To accept a given rate quote, the user highlights a given row in the table and takes a given action (e.g., entry of the return key or selection of an Accept button, etc.). This action navigates the user to the display of FIG. 5, which is a representative user screen by which a user may accept a carrier's published rate for the given selected shipping lane.

Figure 5:
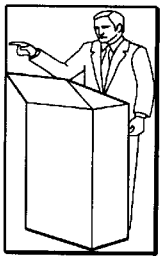
FIG. 5 is a representative user screen by which a user may accept a published rate for a given shipping lane.

As illustrated in FIG. 5, the information in the selected row of the published rate table is used to populate this interface screen. The screen also includes a set of fields 80 and 82 that identify the shipping lane. The user may accept the rate by entering a customer number in the field 84, entering a number of containers desired in the field 86, and then selecting an Accept link 88. Upon acceptance, the server may send a confirmation e-mail both to the customer and the carrier. In particular, the server preferably includes a database that associates a given confirmation number with the identified carrier, shipping lane and rate. Preferably, the carrier is charged a given fee for this service.

Figure 6:
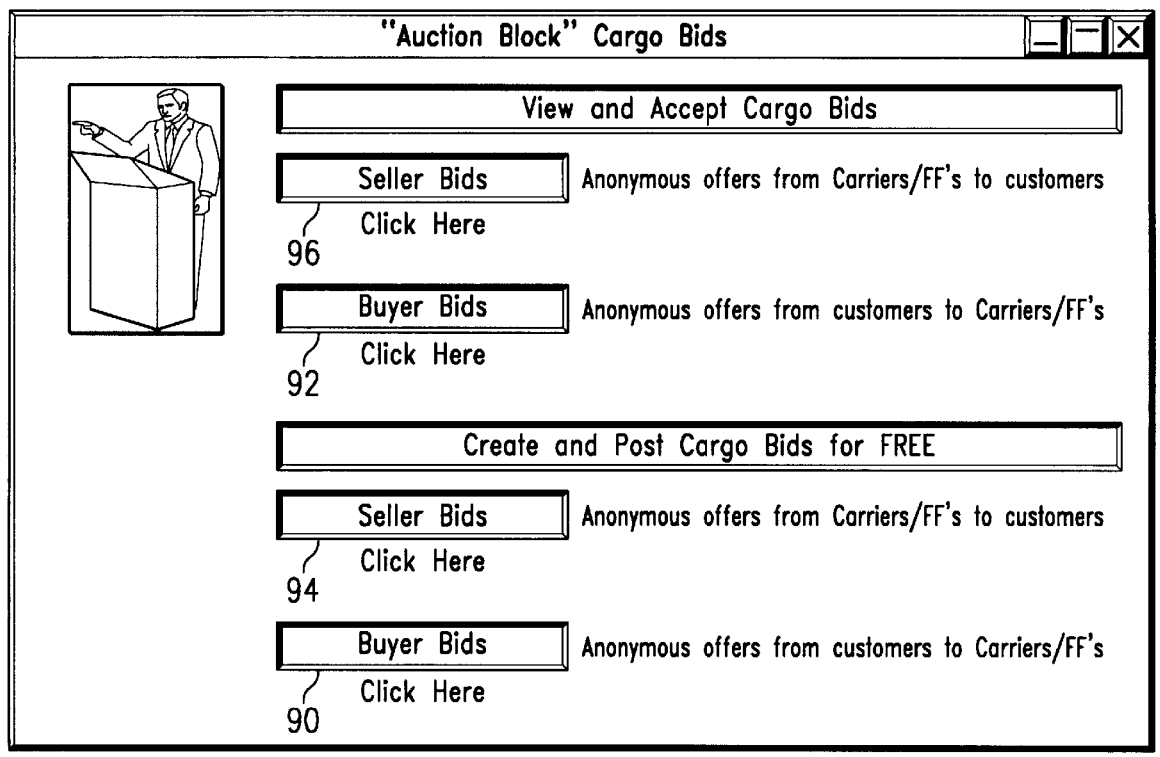
FIG. 6 is a representative user screen for the auction block.

In addition to allowing customers to view particular lanes of interest and associated trade quotes given by the freight forwarders and carriers, the site also provides an online interactive auction block. As noted above, customers may post buyer bids that may be accepted by given carriers. Likewise, carriers may post seller bids that may be accepted by given customers. FIG. 6 is a representative display screen used to navigate to the auction block. A link 90 navigates to the display of FIG. 7, wherein a customer can create an anonymous bid. A link 92 navigates to the display of FIG. 8, which is the buyer bids auction block. A link 94 navigates to the display of FIG. 10, wherein a freight forwarder or carrier can create an anonymous bid. A link 96 navigates to the display of FIG. 11, which is the seller bids auction block.

Figure 7:
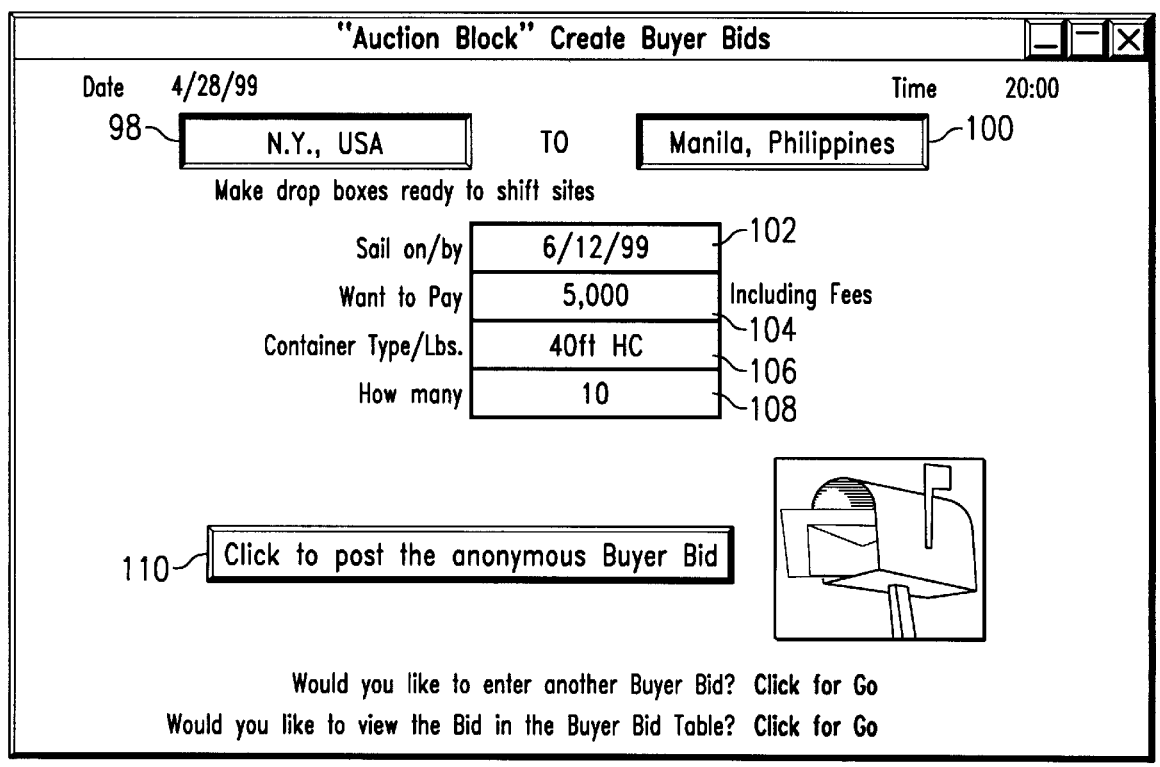
FIG. 7 is a representative user screen by which a user may create and post an anonymous buyer bid on the auction block.

As illustrated in FIG. 7, the customer creates a buyer bid by selecting a shipping lane. This is preferably accomplished using a set of drop-down listboxes 98 and 100. The figure illustrates these boxes in a collapsed form as a result of the user selecting the New York to Manila shipping lane. The user may then enter given bid information in the fields, which include: a sail on/by field 102, a desired payment field 104, a container type field 106, and a field 108 identifying the number of containers. The customer posts the bid, preferably anonymously, by selecting the Post button 110. Of course, as noted above, other data fields may be implemented.

Figures 8, 9:
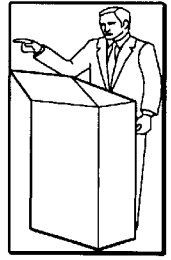
FIG. 8 illustrates the buyer bid auction block having several posted bids.
FIG. 9 illustrates a user screen by which a registered carrier or freight forwarder may accept an anonymous buyer bid.

FIG. 8 illustrates the buyer bids auction block after it has been updated or refreshed to include the buyer bid described above. As illustrated, this display screen includes the sea, land and air rate navigation graphics 42', 44' and 46', as well as a set of listboxes 112 and 114 that are used to select a given shipping lane. All of the bids for that lane are identified on the auction block. A given bid, for example, includes information in the following fields: a company field 116 (labeled anonymous in this example), a bid field 118 (identifying the number of containers needed by the customer), a type field 120 (identifying the type of container needed), a price per container field 122, the ship on/by date field 124, a date placed field 126 (identifying the date the bid was generated), a time placed field 128, and a bids placed field 130. Other data fields may also be used, as previously described. A carrier or freight forwarder that desires to fill a shipping slot accesses the auction block and, thus, may accept a given buyer bid posted there. Preferably, the carrier (i.e., a user of a client machine) accepts a posted bid by highlighting the row on the auction block as illustrated, and then taking a given action, e.g., hitting a key.

FIG. 9 illustrates a representative display screen for use by a carrier in accepting a posted buyer bid. The information identified in the bid is used to populate this screen in the manner previously described. The carrier accepts the bid by entering its identification number in field 132, entering the number of containers in field 134 and selecting the Accept button 136. Upon acceptance, the site notifies both the carrier and the buyer of the transaction. Also, if desired, the server generates a confirmation agreement that is then electronically delivered to each party. A confirmation or transaction number is then saved in the server's database for administration and reconciliation functions as previously described.

Figure 10:
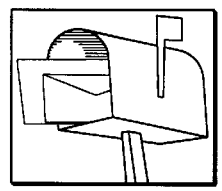
FIG. 10 illustrates a user screen by which a seller may create and post an anonymous seller bid on the auction block.

FIG. 10 illustrates a representative display screen for use by a carrier or freight forwarder to create a seller bid. Preferably, such bids are anonymous, although this is not a limitation of the present invention. The carrier generates a bid by selecting a shipping lane via the listboxes 138 and 140, once again shown in collapsed form following user selection. The interface then identifies a number of fields, for example: a ship date 142, a container Type 144, a maximum number of containers 146, a bid expiration date 148, a bid expires time 150, a freight-to-port date 152, a freight-to-time for that date 154, a price 156, any additional costs 158, the type of additional costs 160, and whether the bid is new 162. The Type field 160 may be populated using a listbox in a known manner. Once the carrier has entered the appropriate information, the seller bid is posted by selecting the Accept button 163.

Figures 11, 12:
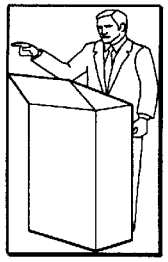
FIG. 11 illustrates a representative seller bids auction block that includes a plurality of seller bids.
FIG. 12 illustrates a representative user screen by which a customer may accept a seller bid posted on the auction block.

FIG. 11 illustrates the seller bids auction block after it has been updated or refreshed to include the seller bid described above. A pair of listboxes 164 and 166 is used to identify a given shipping lane that has been selected. The seller bids tables includes a number of columns corresponding to the fields described above with respect to FIG. 10. As can be seen, each row of the table represents a given seller for the selected shipping lane. As noted above, although all of the identified bids are anonymous, a given carrier or forwarder can identify itself if desired. Preferably, the table is sorted by ship date, although the various sort may be altered by the user selecting a given table header. To accept a seller bid, a customer highlights a given row of the table and takes a given action. This navigates the customer to the display of FIG. 12. The identified seller bid populates the display as illustrated. The customer accepts the bid by entering the customer number in field 168, entering the number of containers required in field 170, and selecting the Accept button 172. Preferably, only registered customers or subscribers are permitted to engage in accepting posted seller bids. Upon acceptance, an e-mail confirmation is sent to each party, together with a confirmation agreement identifying the terms and conditions that have been agreed upon. At this time, the name of the carrier/forwarder is also revealed to the customer if that information was not previously posted. As also described, the carrier is preferably charged a fee for the service.

The present invention provides numerous advantages over the prior art. Customers that desire to ship cargo or freight may obtain rate information and discounts available from a plurality of different carriers or freight forwarders. There is no need for a customer to expose its identity to obtain a given rate quote. Further, a customer may bid on a given shipping lane of interest in an anonymous manner, and this bid may be accepted by a carrier or freight forwarder that has excess capacity for the lane. In a like manner, carriers may post bids for servicing a given shipping lane that may then be accepted, in whole or in part, by a given customer. Once accepted, the server confirms the agreement by e-mail and issues appropriate confirmation agreements electronically. Preferably, the server charges a given fee per bid accepted, although any convenient fee structure may be implemented.

As noted above, the inventive mechanism is preferably implemented within at least one server. Thus, the invention does not require any modifications to conventional client machine hardware or software. Although not meant to be limiting, the above-described functionality is preferably implemented as standalone native code or, alternatively, as a Java servlet. Generalizing, the above-described functionality is implemented in software executable in a processor, namely, as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, as used herein, a Web "client" should be broadly construed to mean any computer or component thereof directly or indirectly connected or connectable in any known or later-developed manner to a computer network, such as the Internet. The term Web "server" should also be broadly construed to mean a computer, computer platform, an adjunct to a computer or platform, or any component thereof. Of course, a "client" should be broadly construed to mean one who requests or gets the file, and "server" is the entity which downloads the file.

Having thus described our invention, what we claim as new and desire to secure by Letters Patent is set forth in the following claims.

What is claimed is:

1. A method operative at a server for enabling a first entity to negotiate with a second entity online to secure a cargo shipping commitment, comprising the steps of:

having the first entity post a bid to an online auction block maintained at the server;

in response to a request from the second entity to the server identifying a given cargo shipping lane, identifying a set of bids for that shipping lane; and in response to the second entity accepting a given one of the set of bids posted by the first entity, sending a message to the first and second entities confirming a cargo shipping commitment.

2. The method as described in claim 1 wherein the identity of the first entity is anonymous.

3. The method as described in claim 2 further including the step of notifying the second entity of the identity of the first entity after sending the message.

4. The method as described in claim 1 wherein the first entity is a customer that desires to ship goods, and the second entity is a carrier.

5. The method as described in claim 1 wherein the first entity is a carrier, and the second entity is a customer that desires to ship goods.

6. The method as described in claim 1 wherein each of the first and second entities remain anonymous to each other until after the message is sent.

7. The method as described in claim 1 wherein the second entity is charged a fee for the accepted bid.

8. The method as described in claim 1 wherein the bid identifies a number of freight units.

9. The method as described in claim 1 wherein the bid identifies a desired ship date and time.

10. The method as described in claim 1 wherein the bid identifies a desired price.

11. A server connectable to a computer network, comprising:

a database of shipping information;

a display routine for displaying a table of cargo rates indexed by user-selected shipping lane; and an auction routine for enabling users of client machines to negotiate to buy and sell cargo shipping commitments.

12. The server as described in claim 11 wherein the auction routine includes means for enabling a customer to post a bid for a given cargo shipping lane.

13. The server as described in claim 12 wherein the auction routine further includes means for enabling a carrier to accept the bid for the given cargo shipping lane.

14. The server as described in claim 11 wherein the auction routine includes means for enabling a carrier to post a bid for a given cargo shipping lane.

15. The server as described in claim 14 wherein the auction routine further includes means for enabling a customer to accept the bid for the given cargo shipping lane.

16. The server as described in claim 11 wherein the auction routine further includes means for notifying users that a given cargo shipping commitment has been made.

17. The server as described in claim 11 further including means for authorizing a given user to access the auction routine.

* * * * *